(12) United States Patent
Tseng

(10) Patent No.: US 8,979,375 B2
(45) Date of Patent: Mar. 17, 2015

(54) UNIVERSAL BEARING

(71) Applicant: Hsien-Chang Tseng, Taichung (TW)

(72) Inventor: Hsien-Chang Tseng, Taichung (TW)

( * ) Notice: Subject to any disclaimer, the term of this patent is extended or adjusted under 35 U.S.C. 154(b) by 0 days.

(21) Appl. No.: 14/181,627

(22) Filed: Feb. 15, 2014

(65) Prior Publication Data

US 2014/0363111 A1 Dec. 11, 2014

(30) Foreign Application Priority Data

Jun. 5, 2013 (TW) .............................. 102210534 U

(51) Int. Cl.
*F16C 23/04* (2006.01)
*F16C 17/10* (2006.01)

(52) U.S. Cl.
CPC ...................................... *F16C 17/10* (2013.01)
USPC .......................................................... 384/206

(58) Field of Classification Search
CPC ...... F16C 23/04; F16C 23/043; F16C 23/045; F16C 23/046; F16C 23/048
USPC .................. 384/192, 206, 208, 209, 210, 212
See application file for complete search history.

(56) References Cited

U.S. PATENT DOCUMENTS

| 3,115,375 | A | * | 12/1963 | Haller | 384/206 |
| 3,339,989 | A | * | 9/1967 | Kraus | 384/206 |
| 4,718,779 | A | * | 1/1988 | Trudeau | 384/206 |

* cited by examiner

*Primary Examiner* — Phillip A Johnson
(74) *Attorney, Agent, or Firm* — Patent Office of Bang Shia

(57) ABSTRACT

A universal bearing includes a metal piece, a plastic housing and a spherical wheel. The metal piece includes a first insertion portion. The plastic housing wraps around the metal piece and includes a second insertion portion in communication with the first insertion portion. The spherical wheel is pivotally restricted in the first and second insertion portions. The plastic housing reduces the weight of the universal bearing. The plastic housing is formed by injection molding by injection plastic directly around the support portion, therefore, the assembly of the universal bearing will be completed automatically once the plastic housing is formed.

6 Claims, 4 Drawing Sheets

UNIVERSAL BEARING

BACKGROUND OF THE INVENTION

1. Field of the Invention

The present invention relates to a bearing, and more particularly to a universal bearing.

2. Description of the Prior Art

A conventional universal bearing 10 as shown in FIG. 1 generally comprises a metal base 11 formed with an insertion hole 111, and a metal spherical wheel 12 pivotally disposed in the insertion hole 111. The main components of the universal bearing 10 are all made of metal, and therefore the application of this universal bearing 10 is limited due to its heavy weight.

Furthermore, when assembling the universal bearing 10, the inner peripheral edge of the insertion hole 111 must be deformed to restrict the metal spherical wheel 12, which makes machining more difficult, and results in a low yield rate.

The present invention has arisen to mitigate and/or obviate the afore-described disadvantages.

SUMMARY OF THE INVENTION

The primary objective of the present invention is to provide a universal bearing which is light weight and easy to assemble.

To achieve the above objective, a universal bearing in accordance with the present invention comprises: a metal piece, a plastic housing and a spherical wheel.

The metal piece includes a first insertion portion.

The plastic housing wraps around the metal piece and includes a second insertion portion in communication with the first insertion portion.

The spherical wheel is pivotally restricted in the first and second insertion portions.

The plastic housing reduces the weight of the universal bearing. The assembly of the universal bearing in accordance with the present invention will be completed automatically once the plastic housing is formed, which makes the universal bearing very easy to manufacture and assemble, consequently improving production efficiency and economic benefits.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
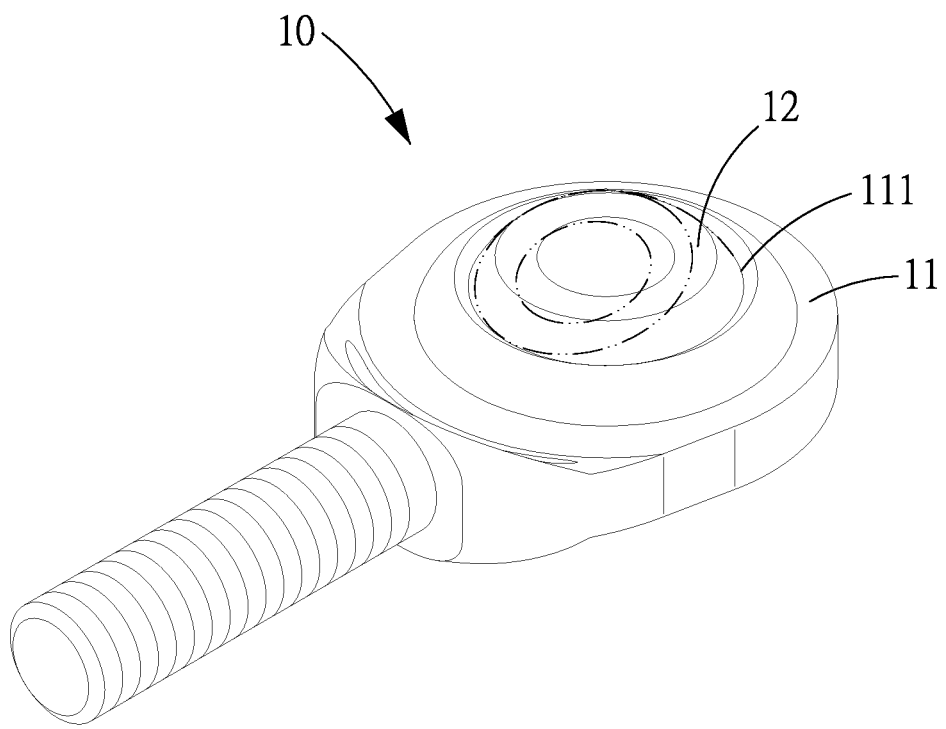
FIG. 1 shows a conventional universal bearing.
Figure 2:
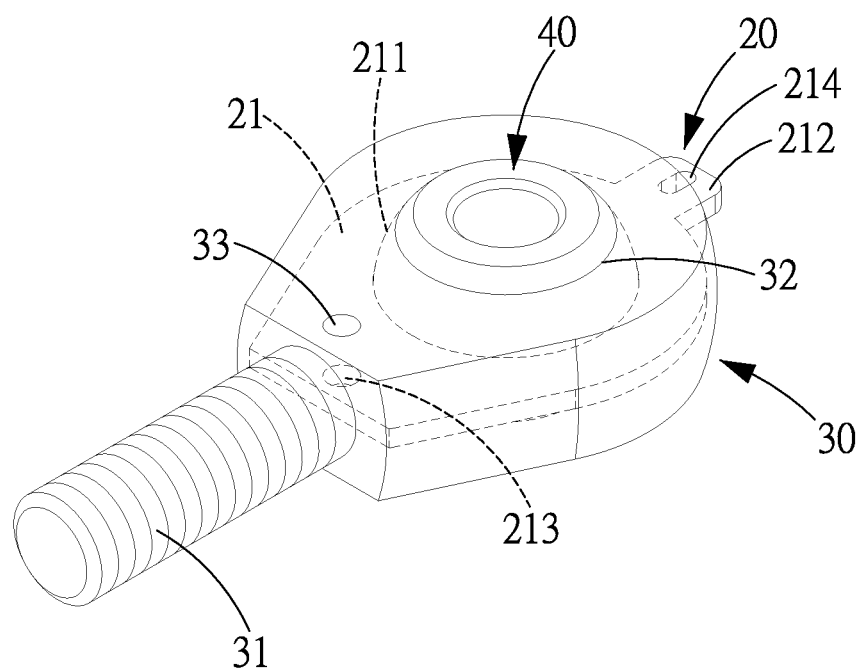
FIG. 2 is a perspective view of a universal bearing in accordance with a preferred embodiment of the present invention.
Figure 3:
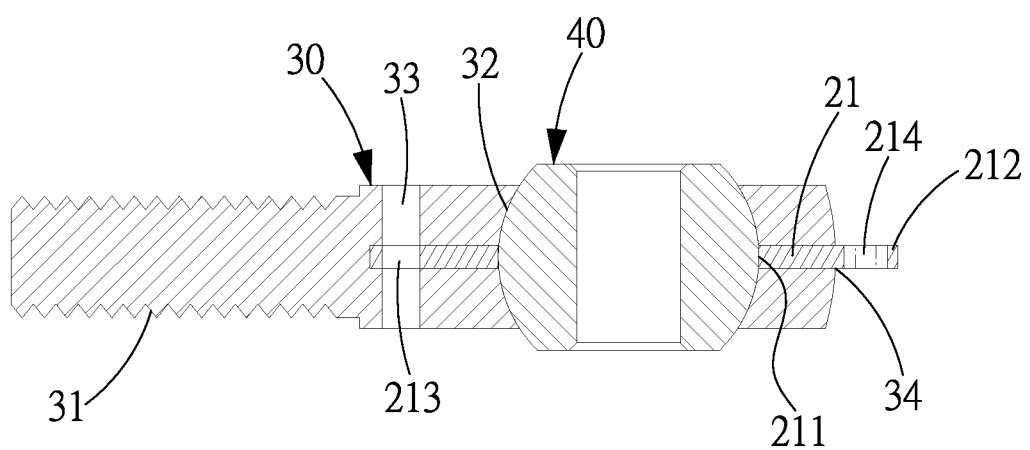
FIG. 3 is a cross sectional view of the universal bearing in accordance with the present invention.
Figure 4:
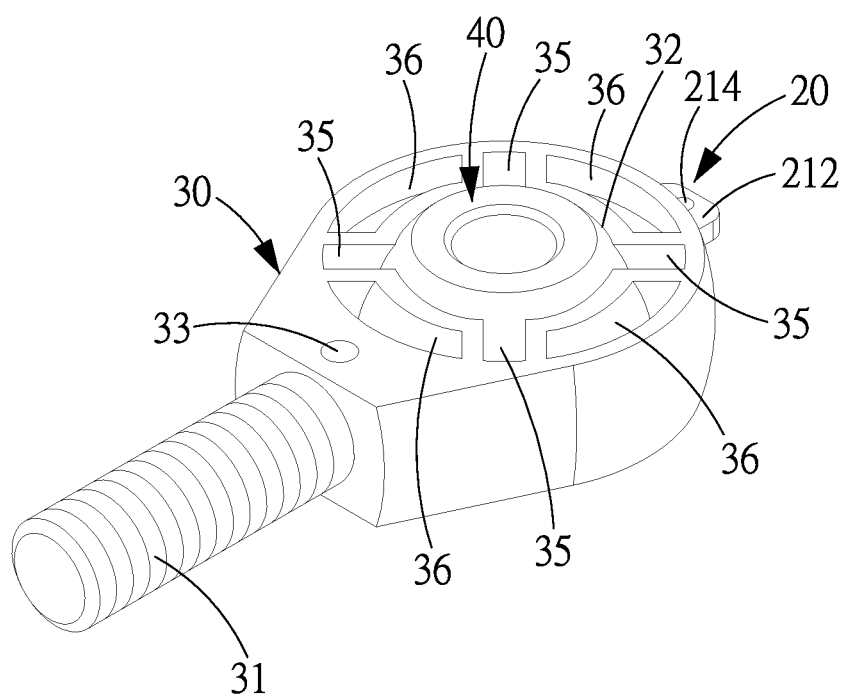
FIG. 4 shows a universal bearing in accordance with another preferred embodiment of the present invention.

Referring to FIGS. 2-4, a universal bearing in accordance with a preferred embodiment of the present invention comprises: a metal piece 20, a plastic housing 30, and a spherical wheel 40.

The metal piece 20 includes an annular support portion 21. At the center of the annular support portion 21 is defined a first insertion portion 211, at the peripheral edge of the annular support portion 21 is formed a protrusion 212, and the annular support portion 21 is further formed with a first positioning hole 213.

The plastic housing 30 wraps around the support portion 21 and includes an assembling portion 31, a second insertion portion 32 in communication with the first insertion portion 211, and a second positioning hole 33 in communication with the first positioning hole 213. The assembling portion 31 is used to connect an object (not shown). On the outer peripheral surface of the plastic housing 30 is formed an insertion hole 34, so that the protrusion 212 can be extended out of the plastic housing 30 via the insertion hole 34. In this embodiment, the plastic housing 30 is formed in a manner that the metal piece 20 and the protrusion 212 are positioned in the positioning holes 213, 33, and then the plastic housing 30 is formed by injection molding by injection plastic directly around the support portion 21.

The spherical wheel 40 is pivotally restricted in the first and second insertion portions 211, 32.

The plastic housing 30 has a low manufacturing cost and light weight, and allows the spherical wheel 40 to pivot more easily. Furthermore, the plastic housing 30 wraps around the metal piece 20, and the metal piece 20 supports the plastic housing 30, so as to improve the structural strength of the universal bearing.

The plastic housing 30 is formed by injection molding in a manner that the metal piece 20 is positioned in advance in a plastic injection mold via the first positioning hole 213 and the protrusion 212, meanwhile, the spherical wheel 40 is pivotally disposed in the first insertion portion 211 of the metal piece 20, and then the plastic housing 30 is directly formed by injection molding, and the second insertion portion 32 and the second positioning hole 33 are automatically formed after injection molding. When the plastic housing 30 cools off and shrinks, the spherical wheel 40 will be restricted in the plastic housing 30, and a clearance will be left between the spherical wheel 40 and the plastic housing 30 to allow the spherical wheel 40 to rotate freely within the first and second insertion portions 211, 32. Namely, the assembly of the universal bearing in accordance with the present invention will be completed automatically once the plastic housing is formed, which makes the universal bearing very easy to manufacture and assemble, consequently improving production efficiency and economic benefits.

Referring then to FIG. 4, to improve easiness of rotation of the spherical wheel 40, around the outer periphery of the second insertion portion 32 of the plastic housing 30 is formed a plurality of slots 35, so as to improve the flexibility of the second insertion portion 32, and consequently allowing the spherical wheel 40 to rotate more easily in the plastic housing 30. The plastic housing 30 can also be formed with a plurality of cavities 36 to reduce weight and material consumption. Further, in the protrusion 212 can also be formed an assistant positioning hole 214 in order to improve stability of the metal piece 20 during injection molding process.

While we have shown and described various embodiments in accordance with the present invention, it is clear to those skilled in the art that further embodiments may be made without departing from the scope of the present invention.

What is claimed is:

1. A universal bearing comprising:
a metal piece with a first insertion portion;

a plastic housing wrapping around the metal piece and including a second insertion portion in communication with the first insertion portion; and a spherical wheel pivotally restricted in the first and second insertion portions.

2. The universal bearing as claimed in claim 1, wherein a plurality of slots is formed around an outer periphery of the second insertion portion of the plastic housing.

3. The universal bearing as claimed in claim 1, wherein a plurality of cavities is formed on the plastic housing.

4. The universal bearing as claimed in claim 1, wherein the metal piece includes an annular support portion, at a center of the annular support portion is defined the first insertion portion, at a peripheral edge of the annular support portion is formed a protrusion, and the annular support portion is further formed with a first positioning hole, the plastic housing wraps around the support portion and includes a second positioning hole in communication with the first positioning hole, on the outer peripheral surface of the plastic housing is formed an insertion hole, so that the protrusion is extended out of the cover via the insertion hole.

5. The universal bearing as claimed in claim 4, wherein the plastic housing includes an assembling portion used to connect an object.

6. The universal bearing as claimed in claim 4, wherein an assistant positioning hole is formed on the protrusion.

\* \* \* \* \*